US009335970B2

(12) United States Patent
Inglett et al.

(10) Patent No.: US 9,335,970 B2
(45) Date of Patent: *May 10, 2016

(54) METHOD OF ENTROPY RANDOMIZATION ON A PARALLEL COMPUTER

(71) Applicant: International Business Machines Corporation, Armonk, NY (US)

(72) Inventors: Todd A. Inglett, Rochester, MN (US); Andrew T. Tauferner, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 450 days.

This patent is subject to a terminal disclaimer.

(21) Appl. No.: 13/785,515

(22) Filed: Mar. 5, 2013

(65) Prior Publication Data

US 2014/0223149 A1  Aug. 7, 2014

Related U.S. Application Data

(63) Continuation of application No. 13/760,510, filed on Feb. 6, 2013.

(51) Int. Cl.
*G06F 7/58* (2006.01)
*H04L 9/08* (2006.01)

(52) U.S. Cl.
CPC .................. *G06F 7/58* (2013.01); *H04L 9/0861* (2013.01); *H04L 2209/125* (2013.01)

(58) Field of Classification Search
CPC .................................. G06F 7/58; H04L 9/0861
See application file for complete search history.

(56) References Cited

U.S. PATENT DOCUMENTS

| 5,001,754 | A | 3/1991 | Deffeyes |
| 7,139,785 | B2 | 11/2006 | Crispin |
| 7,174,355 | B2 | 2/2007 | Henry et al. |
| 2004/0109567 | A1 | 6/2004 | Yang et al. |
| 2009/0323967 | A1 | 12/2009 | Peirce et al. |
| 2010/0306296 | A1* | 12/2010 | Inglett et al. .................. 708/255 |

OTHER PUBLICATIONS

U.S. Appl. No. 13/760,510, by Todd A. Inglett et al., entitled "Method of Entropy Randomization on a Parallel Computer,", filed Feb. 6, 2013.

* cited by examiner

*Primary Examiner* — Benjamin Geib
(74) *Attorney, Agent, or Firm* — Patterson & Sheridan, LLP

(57) ABSTRACT

Method, system, and computer program product for randomizing entropy on a parallel computing system using network arithmetic logic units (ALUs). In one embodiment, network ALUs on nodes of the parallel computing system pseudorandomly modify entropy data during broadcast operations through application of arithmetic and/or logic operations. That is, each compute node's ALU may modify the entropy data during broadcasts, thereby mixing, and thus improving, the entropy data with every hop of entropy data packets from one node to another. At each compute node, the respective ALUs may further deposit modified entropy data in, e.g., local entropy pools such that software running on the compute nodes and needing entropy data may fetch it from the entropy pools. In some embodiments, entropy data may be broadcast via dedicated packets or included in unused portions of existing broadcast packets.

9 Claims, 5 Drawing Sheets

METHOD OF ENTROPY RANDOMIZATION ON A PARALLEL COMPUTER

CROSS-REFERENCE TO RELATED APPLICATIONS

This application is a continuation of co-pending U.S. patent application Ser. No. 13/760,510, filed Feb. 6, 2013. The aforementioned related patent application is herein incorporated by reference in its entirety.

BACKGROUND

Embodiments disclosed herein relate to randomizing entropy on a parallel computing system.

High quality random numbers are essential for many aspects of computer systems, most notably in the area of security. However, computer systems have a difficult time generating high quality random numbers, i.e., numeric sequences that are close to being truly random. There are many algorithms that generate random numbers, but they typically generate the same sequence of numbers, thus suffering from predictability.

Further, some computing systems may lack, or have limited access to, a convenient source of entropy. Entropy data from the seemingly random behavior of a human typing on a keyboard, for example, may be unavailable to computers without keyboard inputs. The computer may instead rely on time intervals between interrupts as a source of entropy, but this is often unhelpful due to the regularity of such intervals and the ability of outside forces to manipulate such intervals. As a result, computing systems with limited external or user inputs, such as massively parallel computers or embedded systems, may lack entropy data.

SUMMARY

Embodiments disclosed herein provide a method, system, and computer program product for performing an operation for randomizing entropy data on a parallel computing system, the operation including broadcasting, from a first node of the parallel computing system, first entropy data to one or more nodes of the parallel computing system. The operation further includes modifying, by arithmetic logic units (ALUs) on the first node and the one or more nodes, the first entropy data during the broadcast. In addition, the operation includes storing the first entropy data, as modified during the broadcast, at each of the one or more nodes.

BRIEF DESCRIPTION OF THE SEVERAL VIEWS OF DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
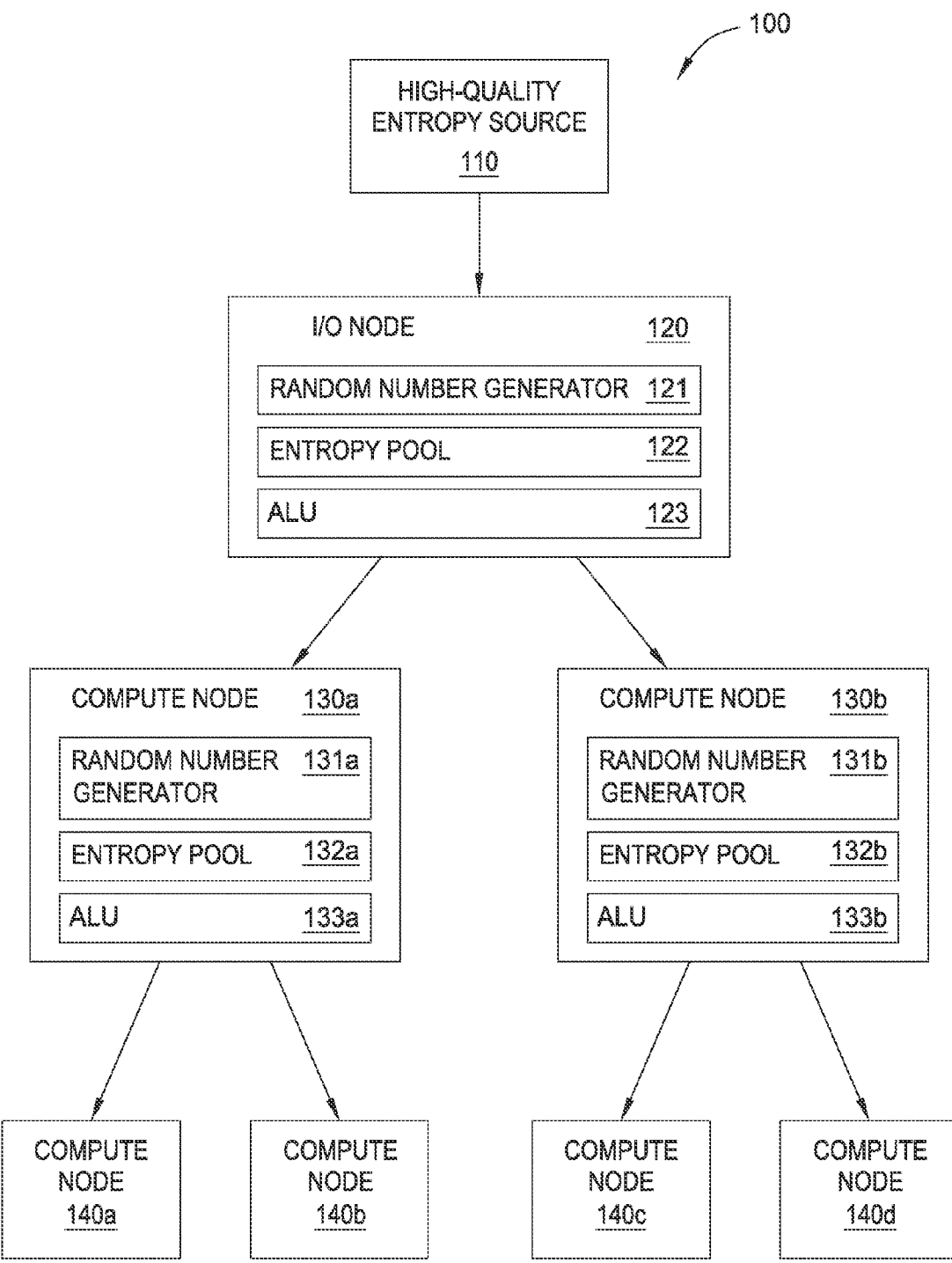
FIG. 1 is a schematic illustrating techniques for randomizing entropy on a massively parallel computing system, according to one embodiment of the invention.

Embodiments of the invention randomize entropy on a parallel computing system using network arithmetic logic units (ALUs). In one embodiment, network ALUs on nodes of the parallel computing system pseudo-randomly modify entropy data during broadcast operations through application of arithmetic and/or logic operations. That is, each compute node's ALU may modify the entropy data during broadcasts, thereby mixing, and thus improving, the entropy data with every hop of entropy data packets from one node to another. Here, the modification of entropy data may be transparent to kernels and programs on the nodes of the parallel computing system and minimize the involvement of such kernels and programs in managing entropy data so as to reduce noise/jitter which would otherwise result from such management. At each compute node, the ALUs may deposit modified entropy data in, e.g., local entropy pools such that software running on the compute nodes may fetch entropy data from the entropy pools. In some embodiments, entropy data may be broadcast via dedicated packets. Alternatively, entropy data may be included in unused portions of existing broadcast packets.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

An entropy property, as used herein, refers to the ability of a random number generator to provide an equal probability of outputting any given value from a set of predefined values that the random number generator is configured to output. To improve the entropy property of a random number generator, an I/O node or a compute node may add entropy data to its entropy pool, which may include a set of one or more entropy pool elements. Each of the entropy pool elements may include an arbitrary length sequence of bits, and may be used as input to a random number generator in order to compute a random number.

FIG. 1 is a schematic diagram 100 illustrating techniques for randomizing entropy on a massively parallel computing system, according to one embodiment. As shown, the schematic 100 includes a high-quality source of entropy 110, which may be any feasible source that is internal, or external, to the parallel computing system. Examples include a service node of the parallel computing system having a keyboard on which users type, a hardware random number generator, an external file system, correctible error events, and the like. Illustratively, entropy data collected at the entropy source 110 may be transmitted (e.g., periodically) to an input/output (I/O) node 120 of the parallel computing system. As discussed in greater detail below, the I/O node 120 may handle I/O operations for a set of compute nodes 130-140 of the parallel computing system.

As shown, the I/O node 120 includes a random number generator 121, an entropy pool 122, and an arithmetic logic unit (ALU) 123. In one embodiment, the random number generator 121 may be configured to use entropy pool elements as initial values in the generation of pseudorandom numbers. That is, the random number generator 121 may generate pseudorandom numbers, with the elements of the entropy pool 122 as seed values. To improve the entropy property of the random number generator 121, new entropy data may be added as elements to the entropy pool 122 such that more initial values are available for the random number generator 121 to use. In particular, entropy data from the high-quality entropy source 110, as modified by the ALU 123, may be added to the entropy pool 122. As discussed in greater detail below, modification of entropy data during broadcast operations allows the high quality entropy data to undergo pseudorandom variation from node to node such that each node acquires different entropy data.

In one embodiment, the ALU 123 may be a hardware component supporting an internal network of the parallel computing system, which may facilitate message passing. The ALU 123 may be configured to perform arithmetic and logic operations to, e.g., generate broadcast addresses, manipulate packet data, and the like. More specifically, the ALU 123 may be configured to modify, during a broadcast operation, entropy data being broadcasted. For example, during the broadcast, the ALU 123 may perform an exclusive or ("XOR") of the packet's payload (i.e., the entropy data) against some other value to modify the payload pseudo-randomly. Here, the other value may be, e.g., a unique rank or location of the I/O node 120, a direction from which the entropy data arrived, other entropy data received from the entropy source 110, etc. In one embodiment, the arithmetic or logic operation which is applied may also be determined based on, e.g., the node rank or another value. In some embodiments, entropy data may be broadcast via dedicated packets, but entropy data may also "piggyback" in unused portions of packets broadcast as part of ongoing operations on the computing core.

As shown, packets broadcast by the I/O node 120 may be transmitted to compute nodes 130a-b and further forwarded to compute nodes 140a-b and 140c-d by each of compute nodes 130a and 130b, respectively. Illustratively, compute node 130a includes a random number generator 131a, an entropy pool 132a, and an ALU 133a, which may be similar to the random number generator 121, the entropy pool 122, and the ALU 123, respectively. Compute node 130b and each of compute nodes 140a-d may also include similar components. In one embodiment, the ALUs 133a-b and ALUs (not shown) of the compute nodes 140a-d may modify packets having entropy data payloads via arithmetic and/or logic operation upon e.g., receipt of the packets, transmittal of the packets, and the like. Doing so mixes, and thus improves, the entropy data with every hop of the packet from one node to another. As a result, relatively small inputs of entropy data from the internal or external source may provide abundant entropy data for all nodes in the system. Further, the ALUs may deposit the mixed entropy data in a corresponding entropy pool, from where software on the respective node may retrieve and use the entropy data. As a result, programs and kernels of the compute nodes 130, 140 may be freed from having to manage entropy data, thereby eliminating noise and/or jitter which may occur during such management.

Figure 2:
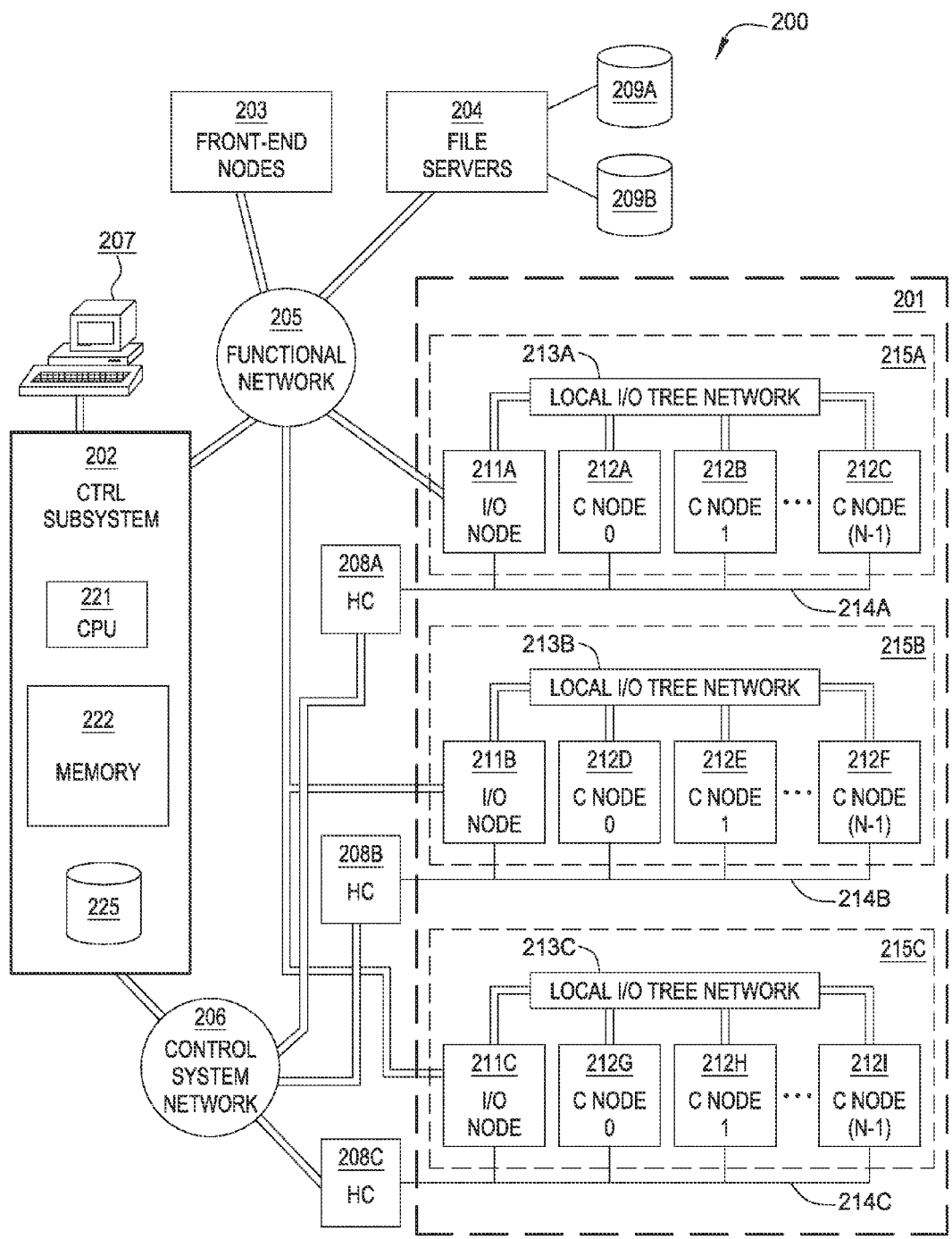
FIG. 2 is a block diagram of components of a massively parallel computer system, according to one embodiment of the invention.

FIG. 2 is a block diagram of components of a massively parallel computer system 200, according to one embodiment disclosed herein. Illustratively, computer system 200 shows the high-level architecture of an IBM Blue Gene® computer system, it being understood that other parallel computer systems could be used, and the description of a preferred embodiment herein is not intended to limit the present disclosure.

As shown, computer system 200 includes a compute core 201 having a number of compute nodes arranged in a regular array or matrix, which perform the useful work performed by system 200. The operation of computer system 200, including compute core 201, may be controlled by control subsystem 202. Various additional processors in front-end nodes 203 may perform auxiliary data processing functions, and file servers 204 provide an interface to data storage devices such as disk based storage 209A, 209B or other I/O (not shown). Functional network 205 provides the primary data communication path among compute core 201 and other system components. For example, data stored in storage devices attached to file servers 204 is loaded and stored to other system components through functional network 205.

Also as shown, compute core 201 includes I/O nodes 211A-C and compute nodes 212A-I. Compute nodes 212 provide the processing capacity of parallel system 200, and are configured to execute applications written for parallel processing. I/O nodes 211 handle I/O operations on behalf of compute nodes 212. Each I/O node 211 may include a processor and interface hardware that handles I/O operations for a set of N compute nodes 212, the I/O node and its respective set of N compute nodes are referred to as a Pset. Compute core 201 contains M Psets 215A-C, each including a single I/O node 211 and N compute nodes 212, for a total of M×N compute nodes 212. The product M×N can be very large. For example, in one implementation M=1024 (1 K) and N=64, for a total of 64 K compute nodes. In some embodiments, each of I/O nodes 211 and compute nodes 212 may include an ALU similar to the ALUs 123, 133 of FIG. 1, which improves entropy data during broadcast operations by applying arithmetic and/logic operations as broadcasted packets hop from one node to another.

In general, application programming code and other data input required by compute core 201 to execute user applications, as well as data output produced by the compute core 201, is communicated over functional network 205. The compute nodes 212 within a Pset 215 communicate with the corresponding I/O node over a corresponding local I/O collective network 213A-C. The I/O nodes, in turn, are connected to functional network 205, over which they communicate with I/O devices attached to file servers 204, or with other system components. Thus, the local I/O collective networks 213 may be viewed logically as extensions of functional network 205, and like functional network 205 are used for data I/O, although they are physically separated from functional network 205. One example of the collective network is a tree network. As discussed in greater detail below, an I/O node 211 may broadcast entropy data over such a tree network, and network ALUs of each compute node 212 on the tree network may pseudorandomly modify the entropy data during the broadcast operation. That is, during each hop of entropy data packets from one compute node 212 to another in the tree network, the ALUs of the compute nodes 212 may, e.g., upon receipt or transmission of the packets, modify the entropy data. Entropy data, as modified during the broadcast operations, may then be stored at each of the compute nodes 212 and used by applications running thereon (e.g., random number generators).

Control subsystem 202 directs the operation of the compute nodes 212 in compute core 201. Control subsystem 202 is a computer that includes a processor (or processors) 221, internal memory 222, and local storage 225. An attached console 207 may be used by a system administrator or similar person. Control subsystem 202 may also include an internal database which maintains state information for the compute nodes in core 201, and an application which may be configured to, among other things, control the allocation of hardware in compute core 201, direct the loading of data on compute nodes 211, and perform diagnostic and maintenance functions.

Control subsystem 202 communicates control and state information with the nodes of compute core 201 over control system network 206. Network 206 is coupled to a set of hardware controllers 208A-C. Each hardware controller communicates with the nodes of a respective Pset 215 over a corresponding local hardware control network 214A-C. The hardware controllers 208 and local hardware control networks 214 are logically an extension of control system network 206, although physically separate.

In addition to control subsystem 202, front-end nodes 203 provide computer systems used to perform auxiliary functions which, for efficiency or otherwise, are best performed outside compute core 201. Functions which involve substantial I/O operations are generally performed in the front-end nodes. For example, interactive data input, application code editing, or other user interface functions are generally handled by front-end nodes 203, as is application code compilation. Front-end nodes 203 are connected to functional network 205 and may communicate with file servers 204.

In one embodiment, the computer system 200 determines, from among a plurality of class route identifiers for each of the compute nodes along a communications path from a source compute node to a target compute node in the network, a class route identifier available for all of the compute nodes along the communications path. The computer system 200 configures network hardware of each compute node along the communications path with routing instructions in dependence upon the available class route identifier and a network topology for the network. The routing instructions for each compute node associate the available class route identifier with the network links between that compute node and each compute node adjacent to that compute node along the communications path. The source compute node transmits a network packet to the target compute node along the communications path, which includes encoding the available class route identifier in a network packet. The network hardware of each compute node along the communications path routes the network packet to the target compute node in dependence upon the routing instructions for the network hardware of each compute node and the available class route identifier encoded in the network packet. As used herein, the source compute node is a compute node attempting to transmit a network packet, while the target compute node is a compute node intended as a final recipient of the network packet.

In one embodiment, a class route identifier is an identifier that specifies a set of routing instructions for use by a compute node in routing a particular network packet in the network. When a compute node receives a network packet, the network hardware of the compute node identifies the class route identifier from the header of the packet and then routes the packet according to the routing instructions associated with that particular class route identifier. Accordingly, by using different class route identifiers, a compute node may route network packets using different sets of routing instructions. The number of class route identifiers that each compute node is capable of utilizing may be finite and may typically depend on the number of bits allocated for storing the class route identifier. An "available" class route identifier is a class route identifier that is not actively utilized by the network hardware of a compute node to route network packets. For example, a compute node may be capable of utilizing sixteen class route identifiers labeled 0-15 but only actively utilize class route identifiers 0 and 1. To deactivate the remaining class route identifiers, the compute node may disassociate each of the available class route identifiers with any routing instructions or maintain a list of the available class route identifiers in memory.

Routing instructions specify the manner in which a compute node routes packets for a particular class route identifier. Using different routing instructions for different class route identifiers, a compute node may route different packets according to different routing instructions. For example, for one class route identifier, a compute node may route packets specifying that class route identifier to a particular adjacent compute node. For another class route identifier, the compute node may route packets specifying that class route identifier to different adjacent compute node. In such a manner, two different routing configurations may exist among the same compute nodes on the same physical network.

Figure 3:
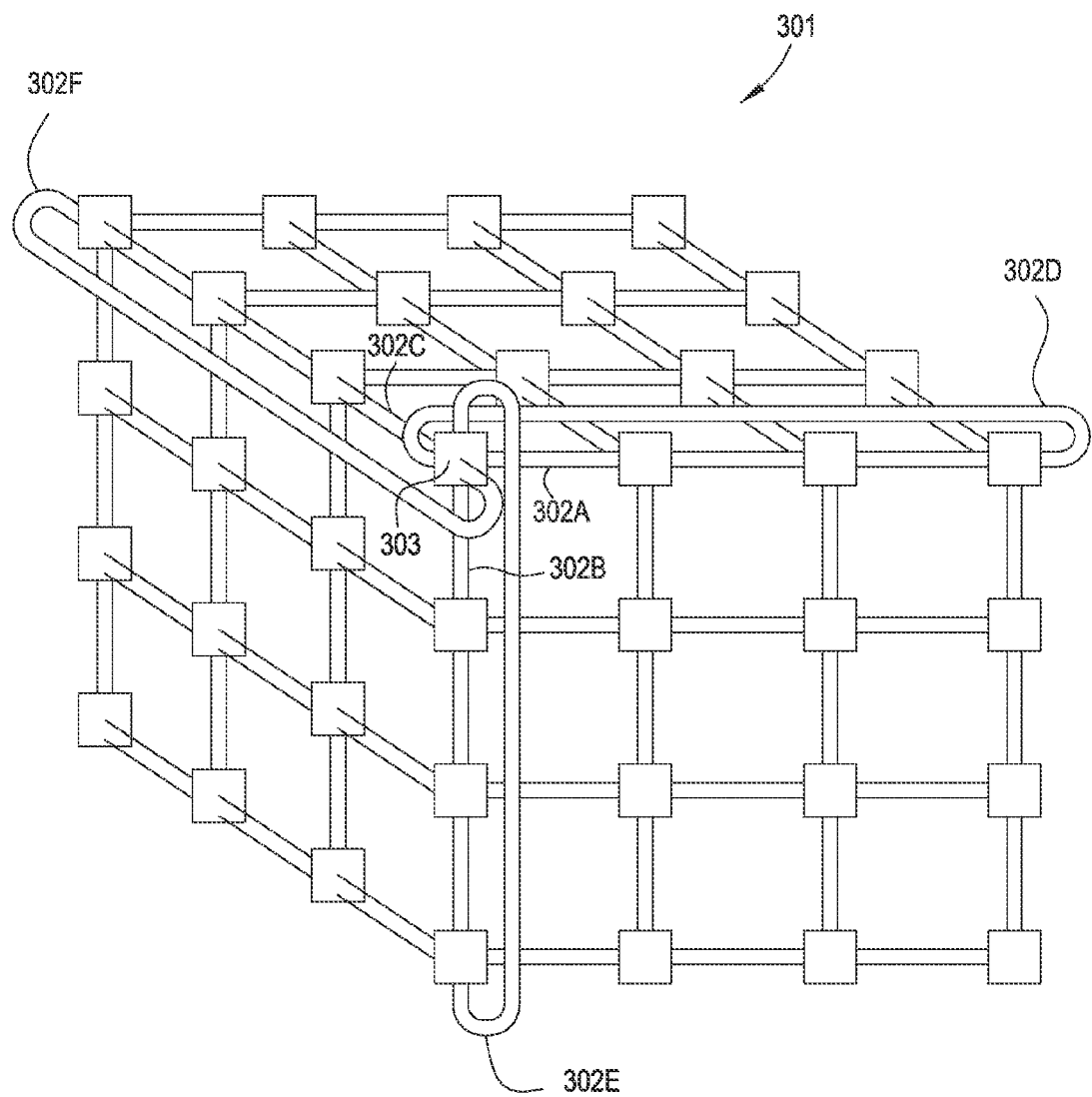
FIG. 3 is a conceptual illustration of a three-dimensional torus network of the system, according to one embodiment of the invention.

In one embodiment, compute nodes 212 are arranged logically in a three-dimensional torus, where each compute node 212 may be identified using an x, y and z coordinate. FIG. 3 is a conceptual illustration of a three-dimensional torus network of system 200, according to one embodiment disclosed herein. More specifically, FIG. 3 illustrates a 4×4×4 torus 301 of compute nodes, in which the interior nodes are omitted for clarity. Although FIG. 2 shows a 4×4×4 torus having 64 nodes, it will be understood that the actual number of compute nodes in a parallel computing system is typically much larger. For example, a complete Blue Gene/L system includes 65,536 compute nodes. Each compute node 212 in torus 301 includes a set of six node-to-node communication links 302A-F which allows each compute nodes in torus 301 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 301, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y or z dimensions form a torus in that dimension because the point-to-point communication links logically wrap around. For example, this is represented in FIG. 3 by links 302D, 302E and 302F which wrap around from a last node in the x, y and z dimensions to a first node. Thus, although node 303 appears to be at a "corner" of the torus, node-to-node links 302A-F link node 303 to nodes 302D, 302E and 302F, in the x, y and z dimensions of torus 301.

Figure 4:
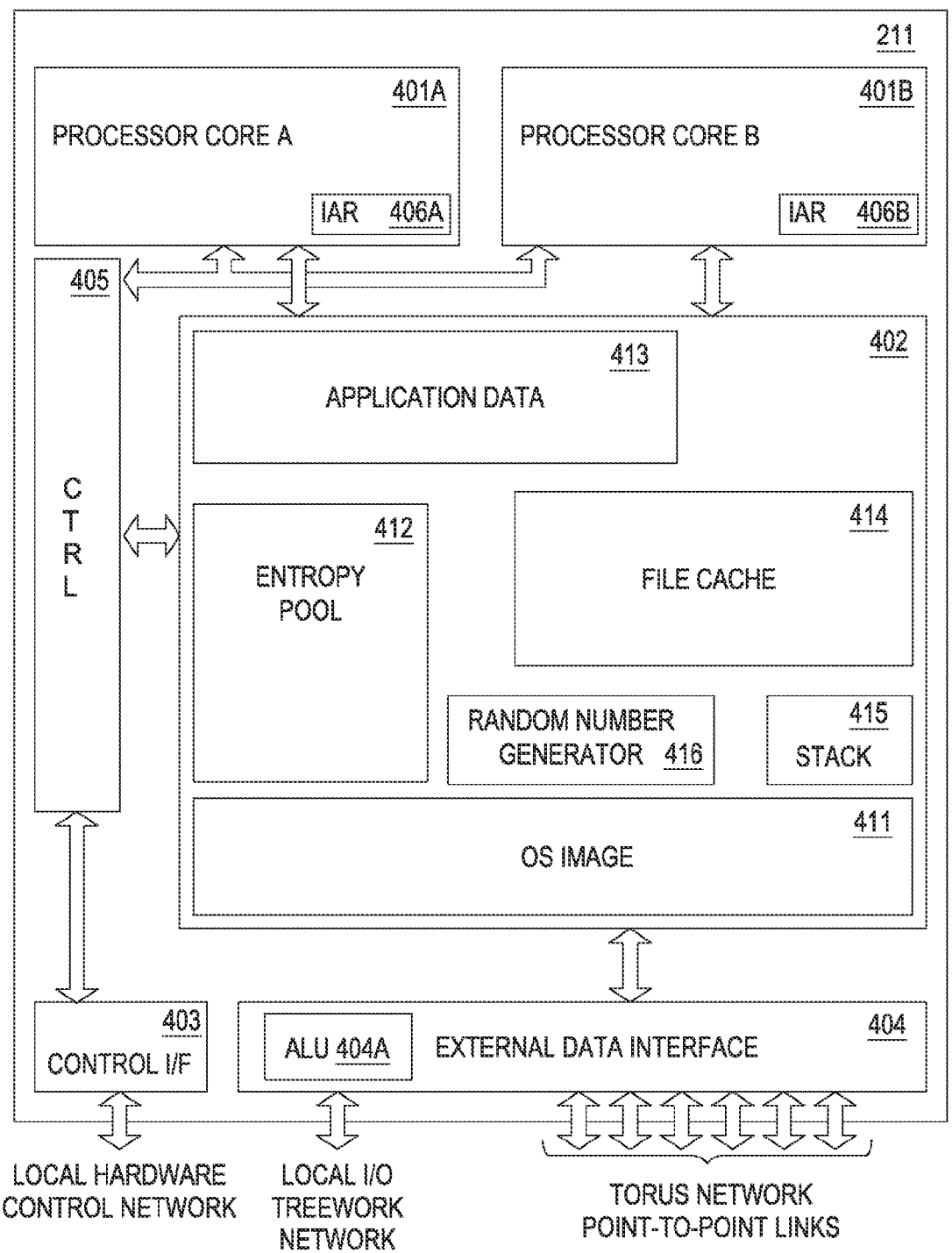
FIG. 4 is a diagram of a node of the system, according to one embodiment of the invention.

FIG. 4 is a diagram of an I/O node 211 of the system 200 of FIG. 2, according to one embodiment. The I/O node 211 may correspond to the I/O nodes 110 and 111 of FIG. 1. In one embodiment, each I/O node 211 may be physically implemented as a single, discrete integrated circuit chip.

As shown, I/O node 211 includes processor cores 401A and 401B, and also includes memory 402 used by both processor cores 401; an external control interface 403 which is coupled to local hardware control network 214; an external data communications interface 404 which is coupled to the corresponding local I/O collective network 213, and the corresponding six node-to-node links 302 of the torus network 301; and monitoring and control logic 405 which receives and responds to control commands received through external control interface 403. Monitoring and control logic 405 may access processor cores 401 and locations in memory 402 on behalf of control subsystem 202 to read (or in some cases alter) the operational state of I/O node 211.

In a Blue Gene system, the external data interface 404 may transmit message passing interface (MPI) messages by encapsulating such messages within packets and transmitting the packets of over a network (e.g., a tree or torus network). For example, the MPI call of MPI_Send( ) may be used to transmit a message, and the call of MPI_Bcast( ) may be used to broadcast the message. Other parallel systems and other parallel computing libraries may include similar mechanisms. Illustratively, the external data interface 404 includes an ALU 404a which may be similar to the ALUs 123, 133 discussed above with respect to FIG. 1. That is, ALU 404a may be configured to modify, during a broadcast operation, entropy data being broadcasted. ALU 404a may generally be capable of performing arithmetic and logic operations on packets traversing the external data interface 404. More specifically, ALU 404a may perform operations (e.g., an XOR operation against some value) to pseudorandomly modify entropy data in packets being broadcast to compute nodes (not shown), thereby mixing and improving the entropy data.

As shown in FIG. 4, memory 402 stores an operating system image 411, an application code image 412 and user application data structures 413 as required. Some portion of memory 402 may be allocated as a file cache 414, i.e., a cache of data read from or to be written to an I/O file. Operating system image 411 provides a copy of a simplified-function operating system running on I/O node 211. Operating system image 411 may include a minimal set of functions required to support operation of the I/O node 211. As shown, the memory 402 also contains entropy pool 412. In some embodiments, the entropy pool may be similar to the entropy pools 122, 132 of FIG. 1. As discussed with reference to FIG. 1, the entropy pool 412 is generally configured to store entropy pool elements received from an internal or external entropy source, which, as discussed, may be a service node, a hardware random number generator, correctible error events, and the like. The pool elements may then be distributed to a random number generator 416 for use in creating pseudorandom numbers, and distributed via broadcast operations to compute nodes. As discussed, the ALU 404a may perform arithmetic and/or logic operations to modify entropy data during such broadcast operations so that relatively small inputs of entropy data from the internal or external source may provide abundant entropy data for all nodes in the system.

Although discussed in FIG. 4 with respect to an I/O node, compute nodes 212 of the parallel computing system may also have processors, memories, external data interfaces, etc. Further, the external data interfaces of the compute nodes may each include an ALU which, similar to ALU 404a, performs arithmetic and/or logic operations to modify entropy data during broadcast operations. Doing so mixes, and thus improves, the entropy data with every hop of the packet from one node to another.

Figure 5:
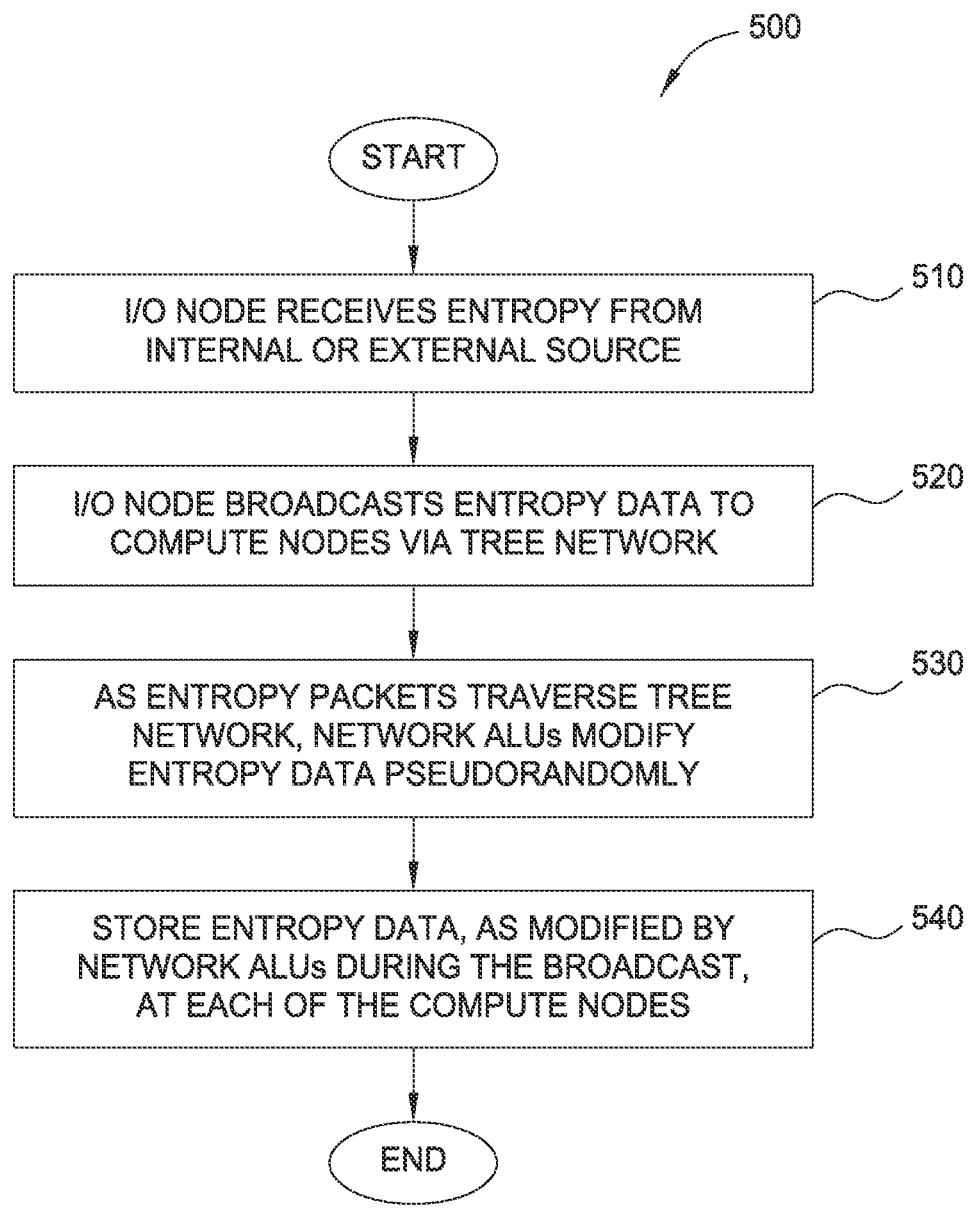
FIG. 5 is a flow chart illustrating a method for randomizing entropy on a parallel computing system, according to one embodiment of the invention.

FIG. 5 is a flow chart illustrating a method 500 for randomizing entropy on a parallel computing system, according to one embodiment. As shown, the method 500 begins at step 510, where an I/O node of the parallel computing system receives entropy data from an internal or external source. Any feasible internal or external entropy source may be used. For example, the source may be a service node having a keyboard on which users type, a hardware random number generator, an external file system, correctible error events, and the like. In one embodiment, the source may transmit entropy data periodically, but not so frequently as to deplete the source itself. Entropy data received from the internal or external source, which may be stored as elements in an entropy pool on the I/O node, is then modified during broadcast operations. As a result, relatively small inputs of entropy data from the source may provide abundant entropy data for all nodes in the system.

At step 520, the I/O node broadcasts entropy pool elements to compute nodes in a tree network. For example, in a Blue Gene system, the MPI call of MPI_Beast( ) may be used to broadcast messages including such entropy pool elements over the tree network. Other parallel systems and other parallel computing libraries may use similar mechanisms for broadcasting messages. In one embodiment, the I/O node may periodically broadcast entropy pool elements such that each of the compute nodes has sufficient entropy data. As discussed, dedicated packets may be used for such broadcasts. Alternatively, unused space within normal network packets may be used.

At step 530, network ALUs pseudorandomly modify the entropy data as it traverses the tree network. As discussed, an ALU of the I/O node may initially perform arithmetic and/or logic operation(s) to pseudorandomly modify entropy data leaving the I/O node. ALUs of compute nodes may further modify the entropy data during each hop of the entropy data packets from one node to another, thereby mixing, and thus improving, the data during the broadcast. For example, the network ALUs may modify received entropy data packets before depositing those packets in a local entropy pool, and also forward those modified packets to other compute nodes. The network ALUs may use any feasible arithmetic and/or logic operation(s) to modify the broadcast entropy data. For example, each network ALU may perform an XOR of the entropy data against another value, such as a rank or location of the node of the ALU, a direction from which the entropy data arrived, other entropy data, and the like. Of course, other arithmetic and/or logic operations (e.g., addition, AND, OR, etc.) against other values may be performed to modify the entropy data. In one embodiment, the particular arithmetic or logic operation which is applied may also be determined based on, e.g., the node rank or another value.

At step 540, the entropy data, as modified by network ALUs during the broadcast operation, is stored at the compute nodes. For example, after modification by an ALU of a compute node, received entropy data (which may also have been modified during previous hops) may be stored as elements of an entropy pool located in a memory of the compute node. Of course, the entropy data may also be stored elsewhere, such as in registers in the ALU, in a storage device, etc. Applications which need entropy data may then fetch (e.g., by invoking an application programming interface (API)) the stored entropy data for use. For example, a random number generator may fetch entropy data to use as initial values in producing pseudorandom numbers.

Although discussed above primarily with respect to broadcasts over a tree network by an I/O node, similar techniques may be used to modify entropy data packets broadcast over networks having other topologies, and other nodes may perform the broadcast. Further, in some embodiments, network ALUs may modify entropy during operations other than broadcast operations. In one embodiment, entropy data may bounce around between nodes endlessly, being modified by network ALUs during the bounces. In another embodiment, applications on compute nodes may invoke an API to request entropy data from the I/O node. In such a case, network ALUs may pseudorandomly modify entropy data transmitted by the I/O node in response to the request as the entropy data traverses the network. In addition, although discussed above primarily with respect to network ALUs, ALUs present elsewhere may also modify entropy data according to techniques disclosed herein.

Advantageously, embodiments disclosed herein modify entropy data broadcast over a parallel computer network to provide distinct entropy data to computing node within the computer network. Doing so improves the quality of the entropy data traversing nodes of the parallel computer, and also ensures that the entropy data on each of the nodes is different. Further, relatively small inputs of original entropy data from an internal or external source may provide abundant entropy data for all nodes in the system. In one embodiment, network ALUs perform the pseudorandom modifications, thereby freeing the kernels and programs of the parallel computer nodes from noise/jitter due to having to manage entropy. Using entropy data, as improved by techniques disclosed herein, random number generators of the compute nodes may have higher entropy properties, such that the random number generators have a more equal probability of outputting any given value from a set of predefined values.

While the foregoing is directed to embodiments of the present disclosure, other and further embodiments of the disclosure may be devised without departing from the basic scope thereof, and the scope thereof is determined by the claims that follow.

What is claimed is:

1. A method for randomizing entropy data in a parallel computing system, comprising:
   broadcasting, from a first node of the parallel computing system, first entropy data to one or more nodes of the parallel computing system;
   modifying, by arithmetic logic units (ALUs) on the first node and the one or more nodes, the first entropy data during the broadcast upon at least one of a receipt and a transmittal of packets which include the first entropy data by the first node and the one or more nodes; and
   storing, at each of the one or more nodes, the first entropy data, either as received or as received and modified by the respective node.

2. The method of claim 1, wherein the first entropy data is broadcast over a tree network, and wherein each node modifies the received first entropy data, stores the first entropy data as modified by the respective node, and sends the first entropy data as modified by the respective node to child nodes.

3. The method of claim 1, wherein the first node is an input/output (I/O) node which provides I/O services in a tree network to a set of compute nodes.

4. The method of claim 1, wherein the ALUs modify the first entropy data by performing at least one of an arithmetic and a logic operation.

5. The method of claim 4, wherein the at least one of the arithmetic and the logic operation is performed against one of a node rank, a node location, and a direction from which the first entropy data that is received arrived at the respective node.

6. The method of claim 4, wherein the at least one of the arithmetic and the logic operation is performed against second entropy data received from the first node.

7. The method of claim 1, wherein the first entropy data is broadcast using either dedicated packets or unused space of non-dedicated packets.

8. The method of claim 1, wherein the first entropy data is received by the first node from an entropy source external to the parallel computing system.

9. The method of claim 1, further comprising, generating a pseudorandom number at least one of the one or more nodes using, as an initial value, the modified first entropy data stored at that node.

\* \* \* \* \*